(12) United States Patent
Cheng et al.

(10) Patent No.: US 10,846,841 B2
(45) Date of Patent: Nov. 24, 2020

(54) METHOD FOR SEPARATING OUT A DEFECT IMAGE FROM A THERMOGRAM SEQUENCE BASED ON FEATURE EXTRACTION AND MULTI-OBJECTIVE OPTIMIZATION

(71) Applicant: UNIVERSITY OF ELECTRONIC SCIENCE AND TECHNOLOGY OF CHINA, Sichuan (CN)

(72) Inventors: Yuhua Cheng, Chengdu (CN); Chun Yin, Chengdu (CN); Haonan Zhang, Chengdu (CN); Xuegang Huang, Chengdu (CN); Ting Xue, Chengdu (CN); Kai Chen, Chengdu (CN); Yi Li, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 59 days.

(21) Appl. No.: 16/370,136

(22) Filed: Mar. 29, 2019

(65) Prior Publication Data
US 2019/0228517 A1 Jul. 25, 2019

(30) Foreign Application Priority Data

May 29, 2018 (CN) .......................... 2018 1 0527596
Nov. 30, 2018 (CN) .......................... 2018 1 1451744

(Continued)

(51) Int. Cl.
*G06T 7/00* (2017.01)
*G06T 7/136* (2017.01)
*G06K 9/34* (2006.01)

(52) U.S. Cl.
CPC ............ *G06T 7/0002* (2013.01); *G06K 9/342* (2013.01); *G06T 7/00* (2013.01); *G06T 7/136* (2017.01);
(Continued)

(58) Field of Classification Search
CPC ...... G06K 9/622; G06K 9/2018; G06K 9/342; G06T 7/136; G06T 7/0002;
(Continued)

(56) References Cited

U.S. PATENT DOCUMENTS 10,229,486 B2   3/2019   Gao et al.

OTHER PUBLICATIONS

Huang, Xuegang et al. "Adaptive rapid defect identification in ECPT based on K-means and automatic segmentation algorithm". Journal of Ambient Intelligence and Humanized Computing, 2018.
(Continued)

*Primary Examiner* — Brenda C Bernardi
(74) *Attorney, Agent, or Firm* — Oliff PLC

(57) ABSTRACT

The present invention provides a method for separating out a defect image from a thermogram sequence based on feature extraction and multi-objective optimization, we find that different kinds of TTRs have big differences in some physical quantities, such as the energy, temperature change rate during endothermic process, temperature change rate during endothermic process, average temperature, maximum temperature. The present invention extract these features (physical quantities) and cluster the selected TTRs into L clusters based on their feature vectors, which deeply digs the physical meanings contained in each TTR, makes the clustering more rational, and improves the accuracy of defect separation. Meanwhile, the present invention creates a multi-objective function to select a RTTR for each cluster based on multi-objective optimization. The multi-objective function does not only fully consider the similarities
(Continued)

between the RTTR and other TTRs in the same cluster, but also considers the dissimilarities between the RTTR and the TTRs in other clusters, the RTTR is more representative, which guarantees the accuracy of describing the defect outline.

3 Claims, 7 Drawing Sheets

(30) Foreign Application Priority Data

Nov. 30, 2018 (CN) .......................... 2018 1 1451866
Feb. 25, 2019 (CN) .......................... 2019 1 0137931

(52) U.S. Cl.
CPC ............... *G06T 2207/10016* (2013.01); *G06T 2207/10048* (2013.01); *G06T 2207/20081* (2013.01); *G06T 2207/20084* (2013.01); *G06T 2207/30168* (2013.01)

(58) Field of Classification Search
CPC . G06T 2207/30168; G06T 2207/20084; G06T 2207/10048; G06T 2207/10016; G06T 2207/20081
See application file for complete search history.

(56) References Cited

OTHER PUBLICATIONS

Zhu, Peipei et al. "An improved feature extraction algorithm for automatic defect identification based on eddy current pulsed thermography". Mechanical Systems and Signal Processing, vol. 113, pp. 5-21, 2018.
Zhang, Bo et al. "Design of an Automatic Defect Identification Method Based ECPT for Pneumatic Pressure Equipment". Complexity, vol. 2018, pp. 1-16, 2018.

METHOD FOR SEPARATING OUT A DEFECT IMAGE FROM A THERMOGRAM SEQUENCE BASED ON FEATURE EXTRACTION AND MULTI-OBJECTIVE OPTIMIZATION

FIELD OF THE INVENTION

This application claims priorities under the Paris Convention to Chinese Patent Application No. 201810527601.6, filed May 29, 2018, Chinese Patent Applications No. 201811451744.X and 201811451866.9, both filed Nov. 30, 2018, and Chinese Patent Application No. 201910137931.9, filed Feb. 25, 2019, the entirety of which is hereby incorporated by reference for all purposes as if fully set forth herein.

The present invention relates to the field of Non-destructive Testing (NDT), more particularly to a method for separating out a defect image from a thermogram sequence based on feature extraction and multi-objective optimization.

BACKGROUND OF THE INVENTION

Non-destructive Testing (NDT) is a wide group of analysis techniques used in science and technology industry to evaluate the properties of a material, component or system without causing damage. Infrared thermal image detection is one kind of NDT, which obtains the structure information of material through the control of heating and the measurement of surface temperature variation.

Infrared thermal image detection is widely used in various fields of non-destructive testing, because it is fast, safe, and does not require direct contact. In the process of heating, the distribution of Joule heat can be affected by the location of the defect(s) of the material under test. The high Joule heat leads to high temperature area and the low Joule heat leads to low temperature area. The different temperatures can be recorded by the infrared thermal imaging camera, then a thermogram sequence is obtained. For a pixel in the thermogram sequence, its temperature variation with time is called as a transient thermal response (TTR). By distinguishing the difference of TTRs, we can separate out a defect image from the thermal sequence.

In order to separate the defect image, many methods are used to process the thermogram sequence, typical one of them is Fuzzy C-means (FCM). FCM classifies the TTRS through clustering centers based on membership values, its classification is a process of choosing a minimal distance between a TTR and each cluster center. Thus, FCM does not deeply dig the physical meanings contained in each TTR, which makes the rationality of clustering abated, and lowers the accuracy of defect separation.

SUMMARY OF THE INVENTION

The present invention aims to overcome the deficiencies of the prior art and provides a method for separating out a defect image from a thermogram sequence based on feature extraction and multi-objective optimization so as to enhance the rationality of clustering by deeply digging the physical meanings contained in each TTR, thus the accuracy of defect separation is improved.

To achieve these objectives, in accordance with the present invention, a method for separating out a defect image from a thermogram sequence based on feature extraction and multi-objective optimization is provided, comprising:

(1). taking a thermogram sequence, recorded by an infrared thermal imaging camera, as a three-dimensional (3D) matrix denoted by S, where an element S(i,j,t) of 3D matrix S is a pixel value of row i and column j of the thermogram sequence's frame t each frame has I rows and) columns;

(2). selecting G transient thermal responses (TTRs) from 3D matrix S, then extracting each TTR's features: $E^g$, $V_{up}^g$, $V_{down}^g$, $T_{max}^g$, $T_{ave}^g$;

where $E^g$ is the TTR's energy, and calculated according to the following equation:

$$E_g = X_{g,1}^2 + X_{g,2}^2 + \ldots + X_{g,T}^2$$

g is the serial number of the TTR, g=1,2, ..., G, $x_{g,t}$ is the pixel value (temperature value) of TTR g at frame t, t represents 1,2, ..., T, T is the number of frames of the thermogram sequence;

where $V_{up}^g$ is the TTR's temperature change rate during endothermic process, and calculated according to the following equation:

$$V_{up}^g = \frac{x_{g,t_{mid}} - x_{g,t_0}}{t_{mid} - t_0}$$

$t_{mid}$ is the serial number of the last heating frame, $X_{g,t_{mid}}$ is the pixel value (temperature value) of TTR g at frame $t_{mid}$, $t_0$ is the serial number of the first heating frame, $x_{g,t_0}$ is the pixel value (temperature value) of TTR g at frame $t_0$;

where $V_{down}^g$ is the TTR's temperature change rate during endothermic process, and calculated according to the following equation:

$$V_{down}^g = \frac{x_{g,t_{mid}} - x_{g,t_{end}}}{t_{end} - t_{mid}}$$

$t_{end}$ is the serial number of the last heat releasing frame, $x_{g,t_{end}}$ is the pixel value (temperature value) of TTR g at frame $t_{end}$;

where $T_{ave}^g$ is the TTR's average temperature, and calculated according to the following equation:

$$T_{ave}^g = \frac{x_{g,1} + x_{g,2} + \ldots + x_{g,T}}{T}$$

where $T_{max}^g$ is the TTR's maximum temperature, and calculated according to the following equation:

$$T_{max}^g = \max(X_{g,1}, X_{g,2}, \ldots, X_{g,T});$$

(3). creating a feature vector for each TTR, where feature vector is denoted by $X_g = (E^g, V_{up}^g, V_{down}^g, T_{gave}^g, T_{max}^g)$, g=1,2, ..., G, then clustering the GTTRs into L clusters based on their feature vectors;

(4). selecting a RTTR (Representative Transient Thermal Response) for each cluster based on multi-objective optimization, where the multi-objective function is:

minimize $F(_{i'}X) = (f_1(_{i'}X), \ldots, f_L(_{i'}X))^T$ $_{i'}X$ is a TTR selected from cluster i', $f_1(_{i'}X)$ is the Euclidean distance between TTR $_{i'}X$ and center of cluster i' and can be calculated according to the following equation:

$$f_1(_{i'}X) = \min\sqrt{\sum_{t=1}^{T}(_{i'}x_h - _{i'}Center_t)^2}$$

$f_l(_iX)$, $I=2,3,\ldots,L$ are renumbered Euclidean distances $f_{i'j'}(_iX)$ between TTR $_iX$ and center of cluster $j',j\ i'$, and can be calculated according to the following equation:

$$f_{\substack{i'j'\\j'\neq i'}}(_{i'}X) = \min\left(-\sqrt{\sum_{t=1}^{T}(_{i'}x_t - _{j'}Center_t)^2}\right)$$

$_i x_t$ is the pixel value of TTR $_iX$ at frame t, $_iCenter_t$ is the pixel value of the center of cluster i' at frame t, $_jCenter_t$ is the pixel value of the center of cluster j' at frame t;

(5). putting the RTTRs of L clusters by column to create a matrix Y, where a column is a RTTR, which contains T pixel values of the RTTR, the matrix Y is a matrix with size of T–L;

(6). linking the back column to the front column from the first column for each frame of 3D matrix S to obtain T columns of pixels, putting the T columns of pixels by frame order to create a two-dimensional image matrix O with I–j rows and T columns, then performing liner transformation to matrix Y with two-dimensional image matrix O: $R=Y^{-1}*O^T$ to obtain a two-dimensional image matrix R, where $Y^{-1}$ is the pseudo-inverse matrix of matrix Y with size of L–T, $O^T$ is the transpose matrix of two-dimensional image matrix O, two-dimensional image matrix R has L rows and I–j columns;

(7). dividing a row of two-dimensional image matrix R into I rows by column size of J, and putting the I rows together by order to obtain a two-dimensional image with size of I–J, where two-dimensional image matrix R has L rows, thus L two-dimensional images are obtained, selecting a two-dimensional image which has maximal difference of pixel value between defect area and non-defect area from the L two-dimensional images;

(8). using Fuzzy C-Mean algorithm to cluster the selected two-dimensional image: obtaining each pixel's cluster according to pixel's maximal membership, then setting the pixel value of each cluster center to all pixels of the cluster which the cluster center belongs to, where the selected two-dimensional image is turned into a separated image, and converting the separated image into a binary image, where the binary image is the defect image separated from the thermogram sequence.

The objectives of the present invention are realized as follows:

In the present invention, i.e. a method for separating out a defect image from a thermogram sequence based on feature extraction and multi-objective optimization, we find that different kinds of TTRs have big differences in some physical quantities, such as the energy, temperature change rate during endothermic process, temperature change rate during endothermic process, average temperature, maximum temperature. The present invention extract these features (physical quantities) and cluster the selected TTRs into L clusters based on their feature vectors, which deeply digs the physical meanings contained in each TTR, makes the clustering more rational, and improves the accuracy of defect image's separation.

Meanwhile, the present invention creates a multi-objective function to select a RTTR for each cluster based on multi-objective optimization. The multi-objective function does not only fully consider the similarities between the RTTR and other TTRs in the same cluster, but also considers the dissimilarities between the RTTR and the TTRs in other clusters, the RTTR is more representative, which guarantees the accuracy of describing the defect outline.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Figure 1:
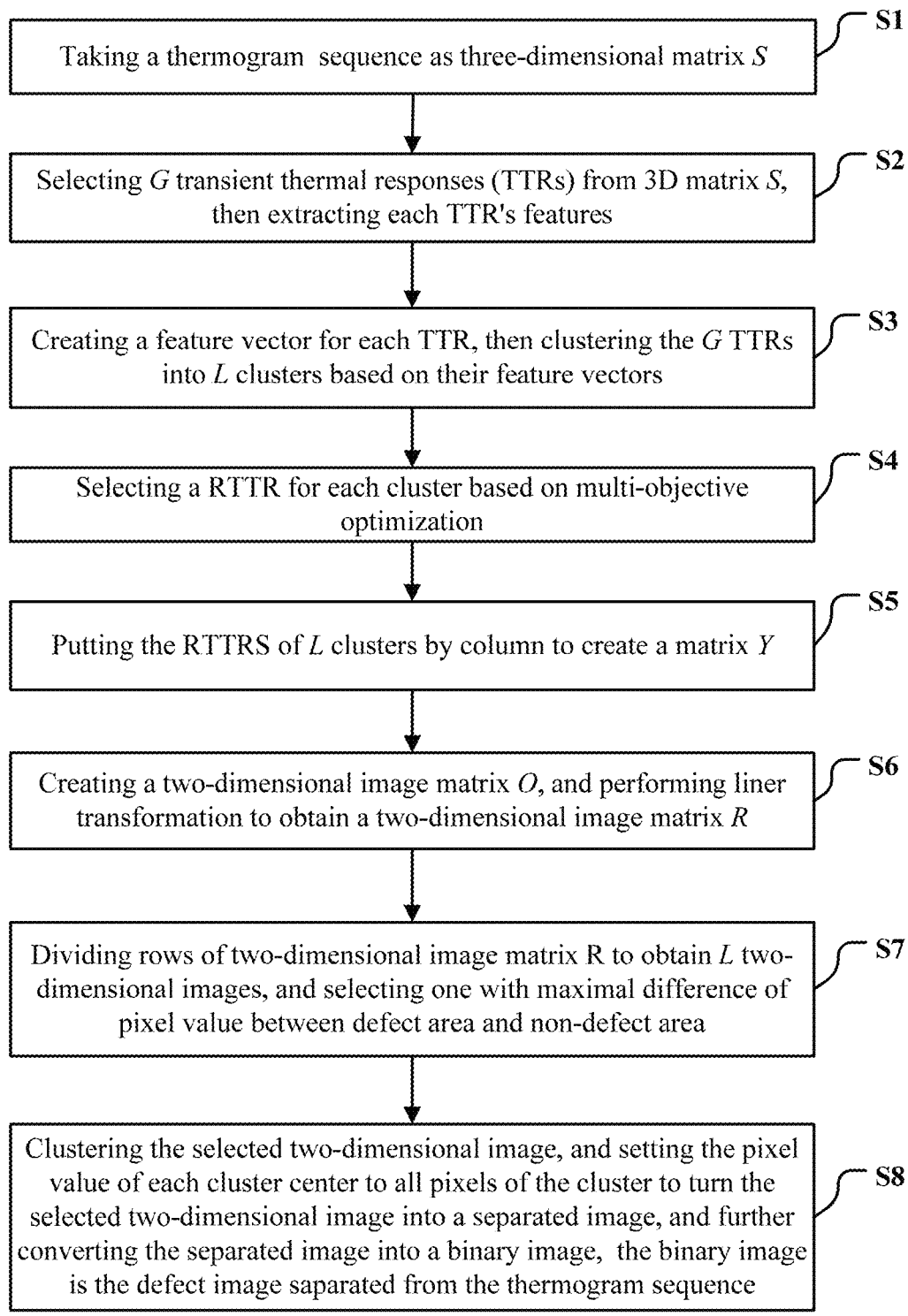
FIG. 1 is a flow diagram of a method for separating out a defect image from a thermogram sequence based on feature extraction and multi-objective optimization in accordance with the present invention.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment

FIG. 1 is a flow diagram of a method for separating out a defect image from a thermogram sequence based on feature extraction and multi-objective optimization in accordance with the present invention.

Figure 2:
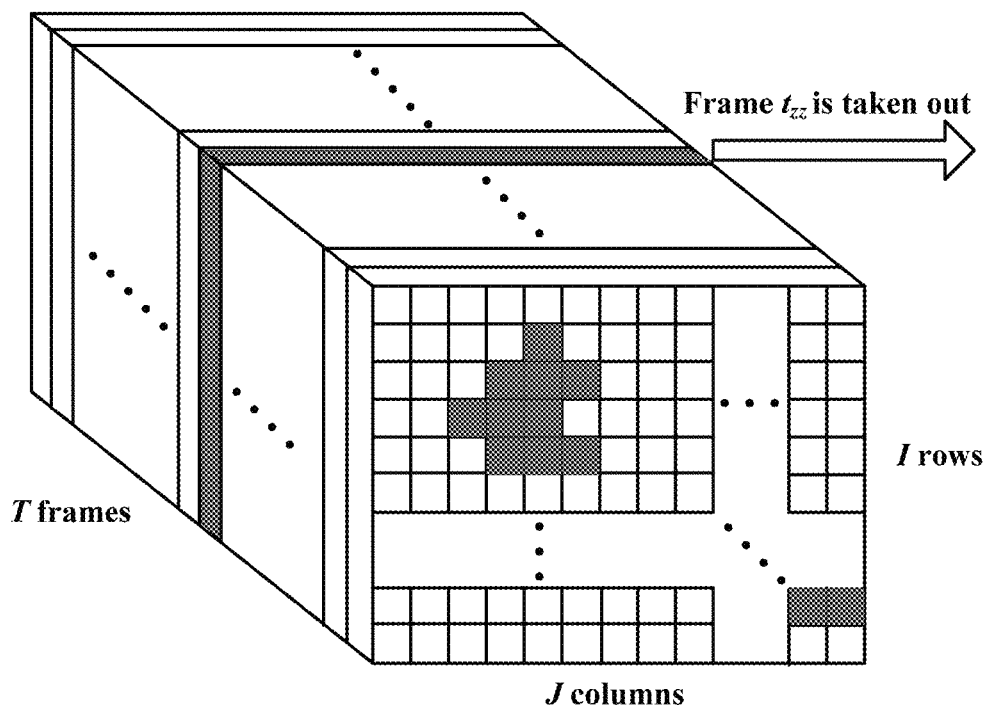
FIG. 2 is a diagram of a 3D matrix in accordance with one embodiment of present invention.

In one embodiment, as shown in FIG. 1, the method for separating out a defect image from a thermogram sequence based on feature extraction and multi-objective optimization is provided, comprising:

Step S1: taking a thermogram sequence, recorded by an infrared thermal imaging camera, as a three-dimensional (3D) matrix denoted by S, where an element S(i,j,t) of 3D matrix S is a pixel value of row i and column j of the thermogram sequence's frame t. As shown in FIG. 2, each frame has I rows and) columns, and the 3D matrix S has T frames.

Step S2: selecting G transient thermal responses (TTRs) from 3D matrix S, then extracting each TTR's features: $E^g$, $V_{up}^g$, $V_{down}^g$, $T_{max}^g$, $T_{ave}^g$;

where $E^g$ is the TTR's energy, and calculated according to the following equation:

$$E^g = X_{g,1}^2 + X_{g,2}^2 + \ldots + X_{g,T}^2$$

g is the serial number of the TTR, g=1,2, ..., G, $x_{g,t}$ is the pixel value (temperature value) of TTR g at frame t, t represents 1,2, ..., T, T is the number of frames of the thermogram sequence;

where $V_{up}^g$ is the TTR's temperature change rate during endothermic process, and calculated according to the following equation:

$$V_{up}^g = \frac{x_{g,t_{mid}} - x_{g,t_0}}{t_{mid} - t_0}$$

$t_{mid}$ is the serial number of the last heating frame, $X_{g,t_{mid}}$ is the pixel value (temperature value) of TTR g at frame $t_{mid}$, $t_0$ is the serial number of the first heating frame, $X_{g,t_0}$ is the pixel value (temperature value) of TTR g at frame $t_0$;

where $V_{down}^g$ is the TTR's temperature change rate during endothermic process, and calculated according to the following equation:

$$V_{down}^g = \frac{x_{g,t_{mid}} - x_{g,t_{end}}}{t_{end} - t_{mid}}$$

$t_{end}$ is the serial number of the last heat releasing frame, $X_{g,t_{end}}$ is the pixel value (temperature value) of TTR g at frame $t_{end}$;

where $T_{ave}^g$ is the TTR's average temperature, and calculated according to the following equation:

$$T_{ave}^g = \frac{x_{g,1} + x_{g,2} + \ldots + x_{g,T}}{T}$$

where $T_{max}^g$ is the TTR's maximum temperature, and calculated according to the following equation:

$$T_{max}^g = \max(X_{g,1}, X_{g,2}, \ldots, X_{g,t});$$

Figure 3:
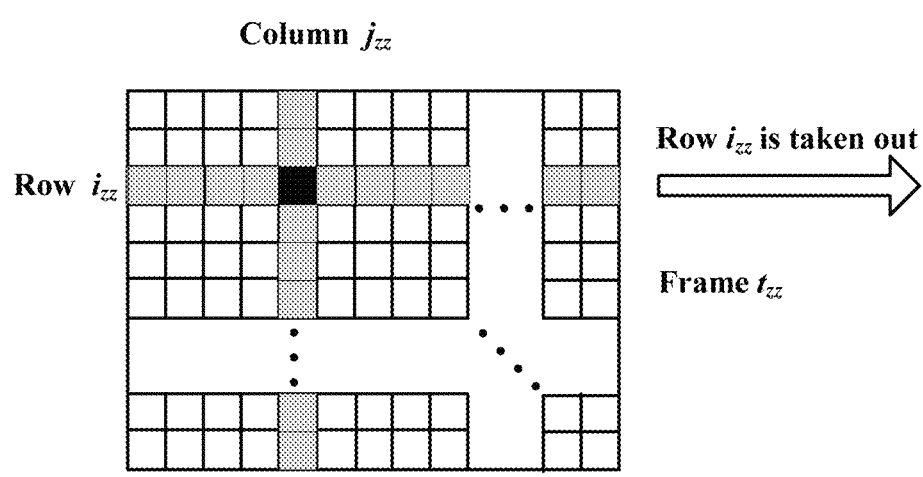
FIG. 3 is a diagram of a frame which has maximal pixel value in accordance with one embodiment of present invention.

In one embodiment, the selecting G transient thermal responses (TTRs) from the 3D matrix S further comprises:

Step S201: selecting the maximal pixel value $S(i_{zz}, j_{zz}, t_{zz})$ from the 3D matrix S, where $i_{zz}$, $j_{zz}$ and $t_{zz}$ are respectively the row number, column number and frame number of the pixel which has the maximal pixel value. As shown in FIG. 2, the frame $T_{zz}$ is taken out from the 3D matrix S. As shown in FIG. 3, the frame $T_{zz}$ has maximal pixel value at row $i_{zz}$ and column $j_{zz}$;

Step S202: selecting column $j_{zz}$ of frame t from the 3D matrix S, and choosing jumping points according to pixel value's variation of column $j_{zz}$ of frame $t_{zz}$ where a jumping point is located between two adjacent pixels which pixel value's difference is greater than a threshold, and the number of jumping points is P, there has P jumping points, then dividing the 3D matrix S into P+1 row data blocks by rows which the P jumping points belong to;

selecting the maximal pixel value $S^p(i_{zz}^p, j_{zz}^p, t_{zz}^p)$ from the $p^{th}$ row data block $S^p$, p=1,2, ..., p+1, where $i_{zz}^p, j_{zz}^p$, and $t_{zz}^p$ are respectively the row number, column number and frame number of the pixel which has the maximal pixel value, thus the TTR corresponding to the maximal pixel value $S^p(i_{zz}^p, j_{zz}^p, t_{zz}^p)$ is $S^p(i_{zz}^p, k_{zz}^p, t)$ |–t=1,2, ..., T;

setting the temperature threshold of $p^{th}$ row data block to $THRE^p$, then calculating the correlation $Re^b$ between TTR $S^p(i_{zz}^p, j_{zz}^p, t)$ and TTR $S^p(i_{zz}^p b, j_{zz}^p, t)$ |— where pixel interval b is set to 1,2, ..., in order, meanwhile, judging the correlation $Re^b$: when the correlation $Re^b$ is smaller than $THRE^p$, stopping the calculation of the correlation $Re^b$, where pixel interval b is the step length $CL^p$ of the $p^{th}$ row data block $S^p$;

Step S203: selecting row $i_{zz}$ of frame $t_{zz}$ from the 3D matrix S, and choosing jumping points according to pixel value's variation of row $i_{zz}$ of frame $t_{zz}$, where a jumping point is located between two adjacent pixels which pixel value's difference is greater than a threshold, and the number of jumping point is Q, there has Q jumping points, then dividing the 3D matrix S into Q+1 column data blocks by columns which the Q jumping points belong to;

selecting the maximal pixel value $S^q(i_{zz}^q, j_{zz}^q, t_{zz}^q)$ from the $q^{th}$ column data block $S^q$, q=1,2, ..., Q+1, where $i_{zz}^q$, $j_{zz}^q$, and $t_{zz}^q$ are respectively the row number, column number and frame number of the pixel which has the maximal pixel value, thus the TTR corresponding to the maximal pixel value $S^q(i_{zz}^q, j_{zz}^q, t_{zz}^q)$ is $S^q(i_{zz}^q, j_{zz}^q, t)$|–t=1,2, ..., T;

setting the temperature threshold of $q^{th}$ row data block to $THRE^q$, then calculating the correlation $Re^d$ between TTR $S^q(i_{zz}^q, j_{zz}^q, t)$ and TTR $S^q(i_{zz}^q, j_{zz}^q d, t)$ |— where pixel interval d is set to 1,2, ..., in order, meanwhile, judging the correlation $Re^d$: when the correlation $Re^d$ is smaller than $THRE^d$, stopping the calculation of the correlation $Re^d$, where pixel interval d is the step length $CL^q$ of the $q^{th}$ column data block $S^q$.

Figure 4:
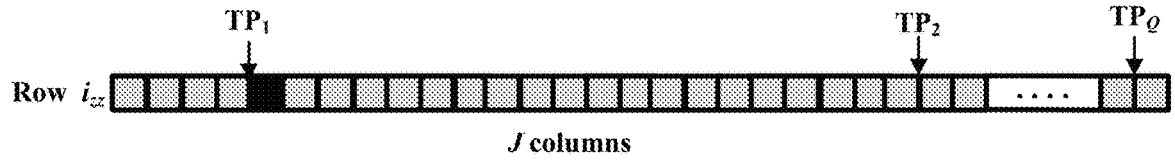
FIG. 4 is a diagram of a row that the maximal pixel value is at in accordance with one embodiment of present invention.
Figure 5:
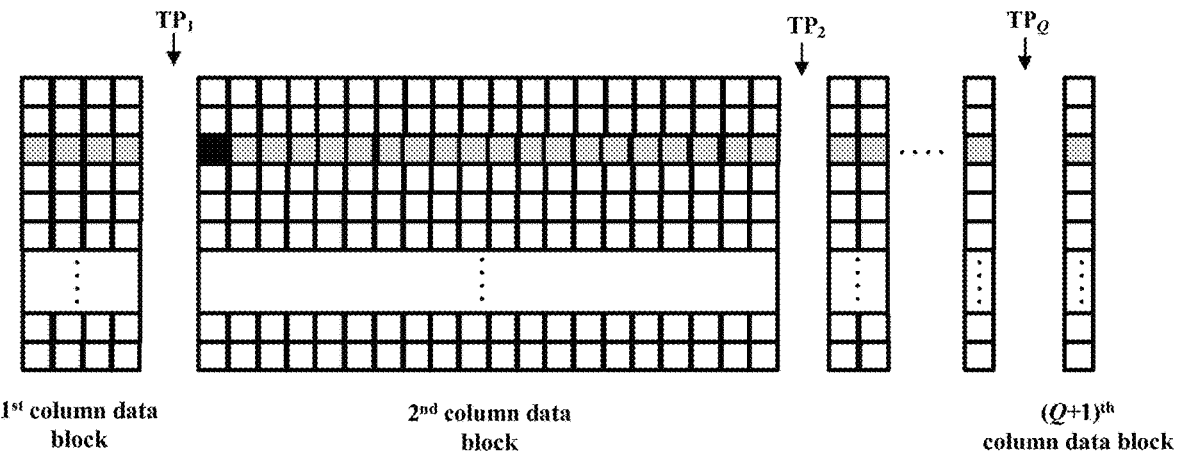
FIG. 5 is a diagram of dividing a 3D matrix S into Q+1 column data blocks in accordance with one embodiment of present invention.
Figure 6:
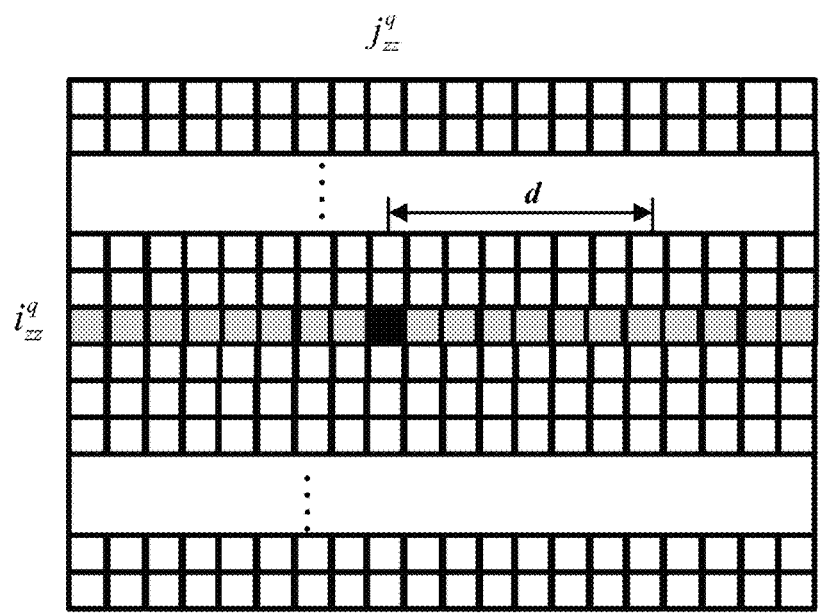
FIG. 6 is a diagram of step length of column data block in accordance with one embodiment of present invention.

In the embodiment, the column data blocks is taken as a example. As shown in FIG. 3, row $i_{zz}$ of frame $t_{zz}$ is taken out from the 3D matrix S. As shown in FIG. 4, Q jumping points are chosen according to pixel value's variation of row $i_{zz}$ of frame $t_{zz}$, where a jumping point is located between two adjacent pixels which pixel value's difference is greater than a threshold. As shown in FIG. 5, the 3D matrix S is divided into Q+1 column data blocks by columns which the Q jumping points belong to. As shown in FIG. 6, d is the step length $CL^q$ of the $q^{th}$ column data block $S^q$, when the correlation $Re^d$ is smaller than temperature threshold $THRE^d$.

Figure 7:
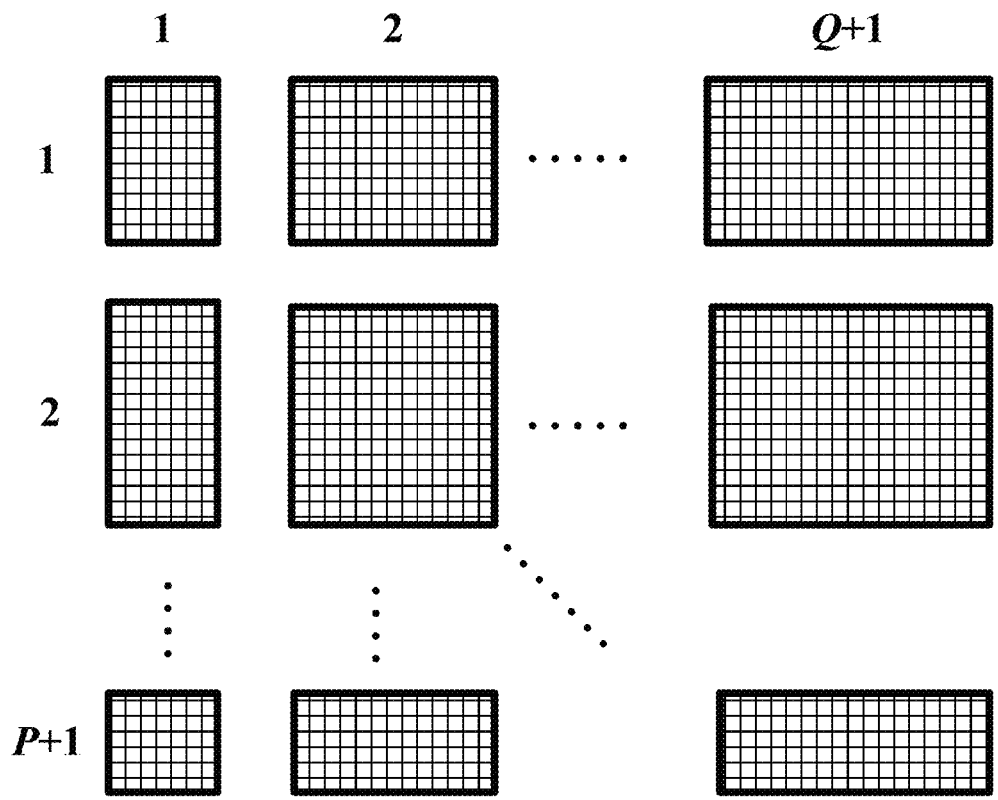
FIG. 7 is a diagram of dividing a 3D matrix S into (P+1)-(Q+1) data blocks in accordance with one embodiment of present invention.
Figure 8:
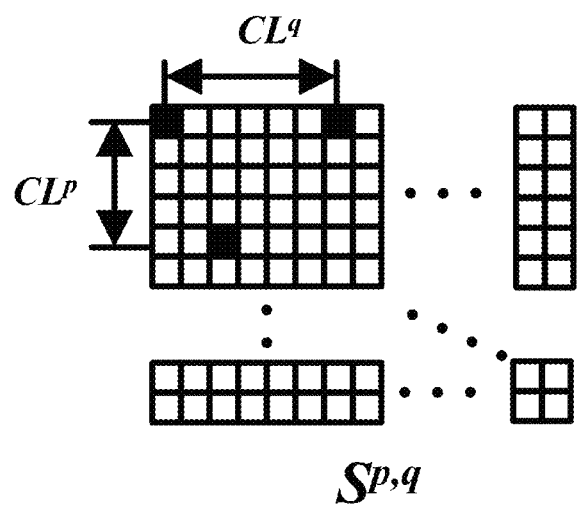
FIG. 8 is a diagram of TTRs selected from a data block in accordance with one embodiment of present invention.

Step S204: dividing the 3D matrix S into (P+1)-(Q+1) data blocks by the rows which the P jumping points belong to and by columns which the Q jumping points belong to, where the data block at $p^{th}$ by row and $q^{th}$ by column is $S^{p,q}$. As shown in FIG. 7, (P+1)-(Q+1) data blocks is obtained;

Step S205: for each data block SP'q, setting a threshold DD and initializing set number g=1 and pixel location i=1, j=1, then storing the TTR $S(i_{zz}, j_{zz}, t)$, t=1,2, ..., T in set X(g), calculating the correlation $Re_{i,j}$ between set X(g) and the TTR $S^{p,q}(i,j,t)$, t=1,2, ..., T at $i^{th}$ row, $j^{th}$ column, and judging: if $Re_{i,j}$ <DD, then g=g+1, and storing the TTR $S^{p,q}(i,j,t)$, t=1,2, ..., T in set X(g), otherwise i=i+$CL^p$, and continuing to calculate the correlation $Re_{i,j}$ between set X(g) and the TTR $S^{p,q}(i,j,t)$, t=1,2, ..., T at $i^{th}$ row, $j^{th}$ column and judge, where if i >$M^{p,q}$, then i=i–$M^{p,q}$ j=j+$CL^q$, if j >$N^{p,q}$, then terminating the calculation and judgment, each set X(g) is a selected TTR, $M^{p,q}$, $N^{p,q}$ are respectively the number of rows and the number of columns of data block $S^{p,q}$. As shown in FIG. 8, the TTRs corresponding to the black boxes are TTRs selected from the data block $S^{p,q}$, which are judged and selected by step length $CL^p$, $CL^q$.

putting selected TTRs of all data blocks together to obtain the G transient thermal responses, the selection of G transient thermal responses (TTRs) from the 3D matrix S is finished. In one embodiment, 470 TTRs is obtained.

Step S3: creating a feature vector for each TTR, where feature vector is denoted by $X_g=(E^g, V_{up}{}^g, V_{down}{}^g, T_{ave}{}^g, T_{max}{}^g)$, then clustering the G TTRs into L clusters based on their feature vectors.

In the embodiment, the clustering the TTRs into L clusters based on their feature vectors further comprises:

Step S301: creating a neural network of Self-Organizing Map (SOM), where the number of neurons of input layer is 5, i.e. the number of features of a TTR, the number of neurons of mapping layer is L', and clustering the features of G TTRs into L' clusters and taking the centers of the L' clusters as initial weights of neurons of mapping layer, where an initial weight of $l^{th}$ neuron of mapping layer can be denoted as $W_l^0(w_{1,l}{}^0, w_{2,l}{}^0, w_{3,l}{}^0, w_{4,l}{}^0, w_{5,l}{}^0)$ L* l=1,2, ..., L', $w_{1,l}{}^0, w_{2,l}{}^0, w_{3,l}{}^0, w_{4,l}{}^0, w_{5,l}{}^0$ respectively correspond to 5 features of $l^{th}$ center of the L' clusters, i.e. TTR's energy, TTR's temperature change rate during endothermic process, TTR's temperature change rate during endothermic process, TTR's average temperature and TTR's maximum temperature, then initializing number of iterations k=0;

Step S302: in $k^{th}$ iteration, calculating impact coefficient $B_k^z$ of each feature:

$$B_k^z = \frac{{}_kH_{fisher}(z)}{\sum_{z'=1}^{5} {}_kH_{fisher}(z')}$$

$$_kH_{fisher}(z) = \frac{\sum_{l_1=1}^{L'}\sum_{l_2=1}^{L'}({}_k\mu_{l_1}^z - {}_k\mu_{l_2}^z)^2}{\sum_{l_1=1}^{L'}\sum_{l_2=1}^{L'}({}_k\sigma_{l_1}^{z2} - {}_k\sigma_{l_2}^{z2})}$$

$$_kH_{fisher}(z') = \frac{\sum_{l_1=1}^{L'}\sum_{l_2=1}^{L'}({}_k\mu_{l_1}^{z'} - {}_k\mu_{l_2}^{z'})^2}{\sum_{l_1=1}^{L'}\sum_{l_2=1}^{L'}({}_k\sigma_{l_1}^{z'2} - {}_k\sigma_{l_2}^{z'2})}$$

where $B_k^z$ is the impact coefficient of $z^{th}$ feature in $k^{th}$ iteration, $_km_{ldi\,1}^z$ and $_ks_{l_1}^{z2}$ are the mean and the variance of $z^{th}$ feature in $l_1^{th}$ cluster in $k^{th}$ iteration, $_ks_{l_2}^{z2}$ and $_ks_{l_2}^{z2}$ are the mean and the variance of $z^{th}$ feature in $l_2^{th}$ cluster in $k^{th}$ iteration, $_km_{l_1}^{z'}$ and $_kx_{ldi\,1}^{z'2}$ are the mean and the variance of $z^{th}$ feature in $l_1^{th}$ cluster in $k^{th}$ iteration, $_km_{l_2}^{z'}$ and $_ks_{l_2}^{z'2}$ are the mean and the variance of $z'^{th}$ feature in $l_2^{th}$ cluster in $k^{th}$ iteration;

then updating the weights of neurons of mapping layer choosing a feature vector of a TTR, where the feature vector is denoted as $X_g^k=(E^{g,k}, V_{up}{}^{g,k}, V_{down}{}^{g,k}, T_{ave}{}^{g,k}, T_{max}{}^{g,k})$ and calculating the Euclidean distance $D_{g,l}^k$ between vector $X_g^k$ and neuron weight $w_l^k$ of $l^{th}$ neuron of mapping layer:

$$D_{g,l}^k = \sqrt{B_k^1(E^{g,k} - w_{1,l}^k) + B_k^2(V_{up}^{g,k} - w_{2,l}^k) + B_k^3(V_{down}^{g,k} - w_{3,l}^k) + B_k^4(T_{ave}^{g,k} - w_{4,l}^k) + B_k^5(T_{max}^{g,k} - w_{5,l}^k)}$$

where $W_l^k=(W_{1,l}^k, W_{2,l}^k, W_{3,l}^k, W_{4,l}^k, W_{5,l}^k)$, l=1,2, ..., L';

taking the neuron of mapping layer nearest to $X_g^k$ as a winning neuron 1*, that is:

$$l^* = \arg\min_l(D_{g,l}^k);$$

updating the weight of winning neuron and weights of its neighbors according to the weight $w_l^k$ of winning neuron l*:

$$W_{l\delta}^{k+1} = W_{l\delta}^k h(k) h_{l\delta*}(k)(X_g^k - W_{l\delta}^k)$$

where lδ is one neuron of the neuron set composed of winning neuron and it's neighbors, :(k) is a learning factor and can be calculated according to the following equation:

$$\eta(k) = \begin{cases} 1 & k=0 \\ \dfrac{D_{g,l}^k}{\max(D_{g,l}^k, D_{g,l}^{k-1})} & k \geq 1 \end{cases}$$

$$D_{g,l}^k = \sqrt{B_{k-1}^1(E^{g,k} - w_{1,l}^{k-1}) + B_k^2(V_{up}^{g,k} - w_{2,l}^{k-1}) + B_k^3(V_{down}^{g,k} - w_{3,l}^{k-1}) + B_k^4(T_{ave}^{g,k} - w_{4,l}^{k-1}) + B_k^5(T_{max}^{g,k} - w_{5,l}^{k-1})}$$

learning factor :(k) is used to adjust the weight updating speed;

where $h_{l\delta\alpha}(k)$ is:

$$h_{ll^*}(k) = \exp\left(-\frac{\|r_l - r_{l^*}\|^2}{(\delta \cdot \eta(k))^2}\right)$$

$\|r_l^\delta - r_{l^*}\|^2$ is a distance of winning neuron l* from neuron $i^\delta$, d is a constant;

choosing each feature vector of the GTTRs to update the weights of neurons of mapping layer;

Step S303: choosing each feature vector of GTTRs, where the feature vector is denoted by $X_g^{k+1}$ ($E^{g,k+1}, V_{up}{}^{g,k+1}, V_{down}{}^{g,k+1}, T_{ave}{}^{g,k+1}, T_{max}{}^{g,k+1}$) then inputting vector $X_g^{k+1}$ into the neural network of Self-Organizing Map: calculating the Euclidean distances of vector $X_g^{k+1}$ from neuron weights $W_1^{k+1}, W_2^{k+1}, \ldots, W_L^{k+1}$ of mapping layer, and reclassifying vector $X_g^{k+1}$ into the cluster the nearest neuron weight belongs to;

when k>$k_{max}$ or $|W_L^{k+1}|<e$, terminating iteration, otherwise, k=k+1 and returning step S302;

Step S304: clustering the L' clusters into L clusters by merging the clusters which Euclidean distances of cluster centers between each other are all smaller than a thresholds, where the merged cluster the feature vector of a TTR belongs to is the cluster of the TTR, thus the GTTRs are clustered into L clusters.

Figure 9:
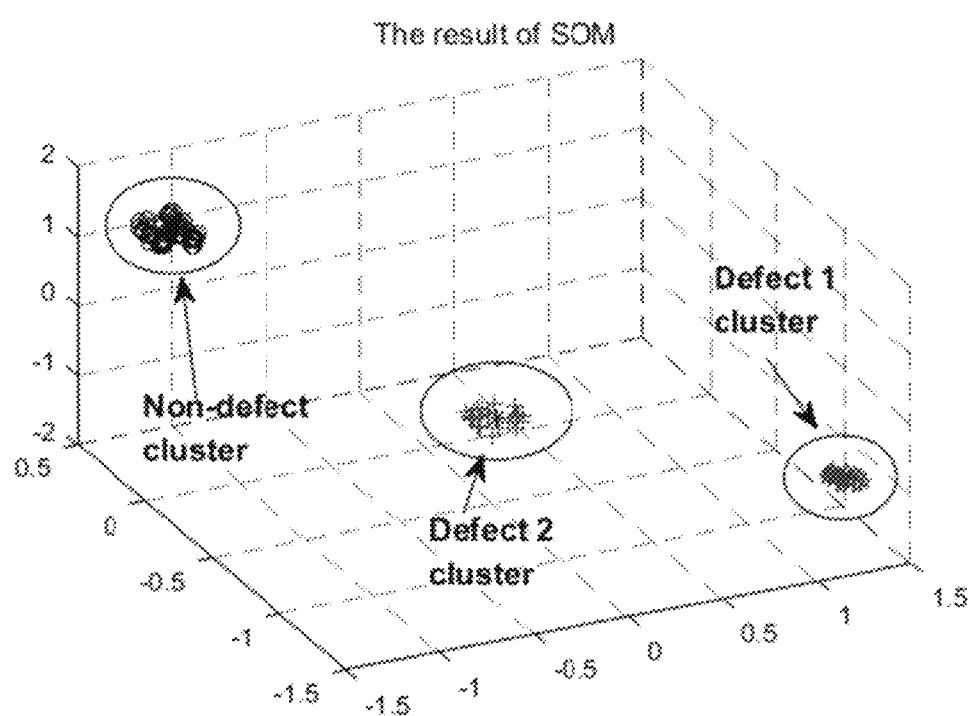
FIG. 9 is a diagram of being clustered into 3 clusters in accordance with one embodiment of present invention.

In one embodiment, the features of 470 TTRs is clustered into 36 clusters, and after merging, they are clustered into 3 clusters, which include a non-defect cluster and two different defect clusters. The result is shown in FIG. 9, there are 56 TTRs in non-defect cluster, 187 TTRs in defect 1 cluster and 227 TTRs in defect 2 cluster.

Step S4: selecting a RTTR (Representative Transient Thermal Response) for each cluster based on multi-objective optimization, where the multi-objective function is:

minimize F $(=(_{i'}X)=(f_1(_{i'}X), \ldots, f_L(_{i'}X))^T$ $_{i'}X$ is a TTR selected from cluster i', $f_1(_{i'}X)$ is the Euclidean distance between TTR $_{i'}X$ and center of cluster i' and can be calculated according to the following equation:

$$f_1(_{i'}X) = \min \sqrt{\sum_{h=1}^{T}(_{i'}x_h - _{i'}Center_h)^2}$$

$f_l(_{i'}X)$, l=2,3, . . . ,L are renumbered Euclidean distances $f_{i',j'}(_{i'}X)$ between TTR $_{i'}X$ and center of cluster j',j i', and can be calculated according to the following equation:

$$f_{i',j'}(_{i'}X) = \min_{j' \ne i}\left(-\sqrt{\sum_{h=1}^{T}(_{i'}x_h - _{j'}Center_h)^2}\right)$$

$_{i'}X_L$ is the pixel value of TTR $_{i'}X$ at frame t, $_{i'}Center_t$ is the pixel value of the center of cluster i' at frame t, $_{j'}Center_t$ is the pixel value of the center of cluster j' at frame t;

In one embodiment, the multi-objective optimization adopts Multi-objective Evolutionary Algorithm Based on Decomposition (MOEA/D) to select a RTTR (Representative Transient Thermal Response) for each cluster, where the initial values of N weight vectors/$u_1$,/$u_2$,p,/$u_N$ of Tchebycheff decomposition algorithm is obtained through the following steps:

initializing N uniformly distributed vectors $W^{u_1}, W^{u_2}, p, W^{u_N}$, where $w^{d_n} = (w_1{}^n, w_2{}^n p, w_L{}^n)^T$, n=1,2, . . . , N, then calculating weight vector $/^{u_n}$ ♂

$$\vec{\lambda}^n = WD(WD(\vec{\omega}^n))$$

$$WD(\vec{\omega}^n) = \left(\frac{\omega_1^n}{\sum_{l=1}^{L}\omega_l^n}, \frac{\omega_2^n}{\sum_{l=1}^{L}\omega_l^n}, \ldots, \frac{\omega_L^n}{\sum_{l=1}^{L}\omega_l^n}\right)^T;$$

WD(WD($w^{d_n}$)) is a calculation of the result of WD ($w^{\alpha_n}$) according to calculation form of WD($w^{\alpha_n}$)

Figure 10A:
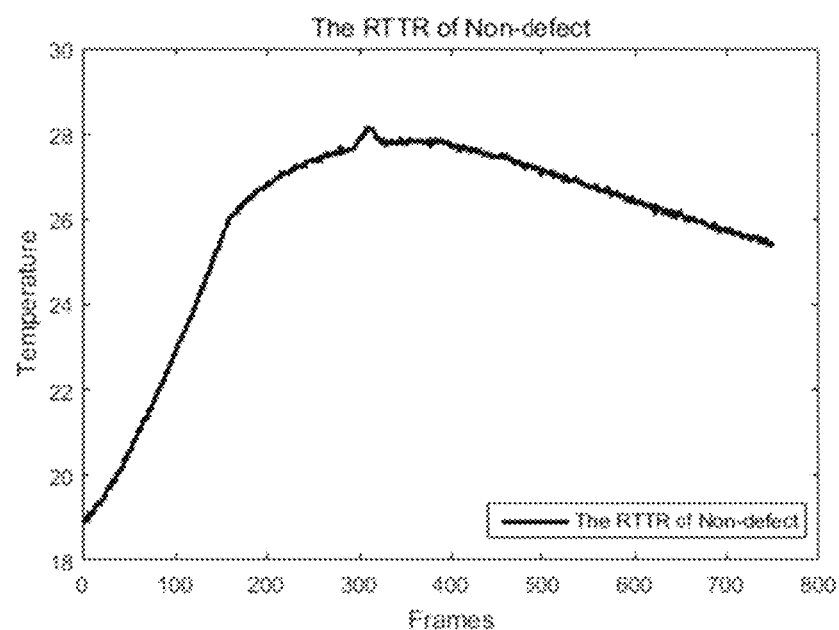
FIG. 10(a), (b), (c) is a diagram of 3 RTTRs selected from 3 clusters respectively in accordance with one embodiment of present invention.
Figure 10B:
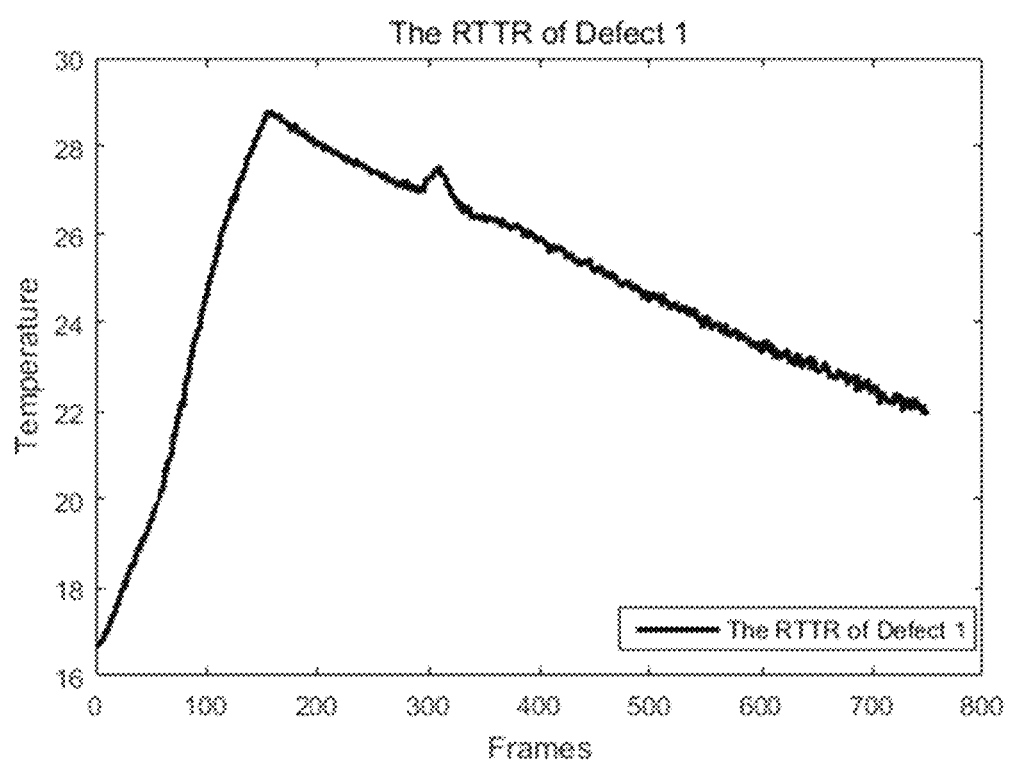
Figure 10:
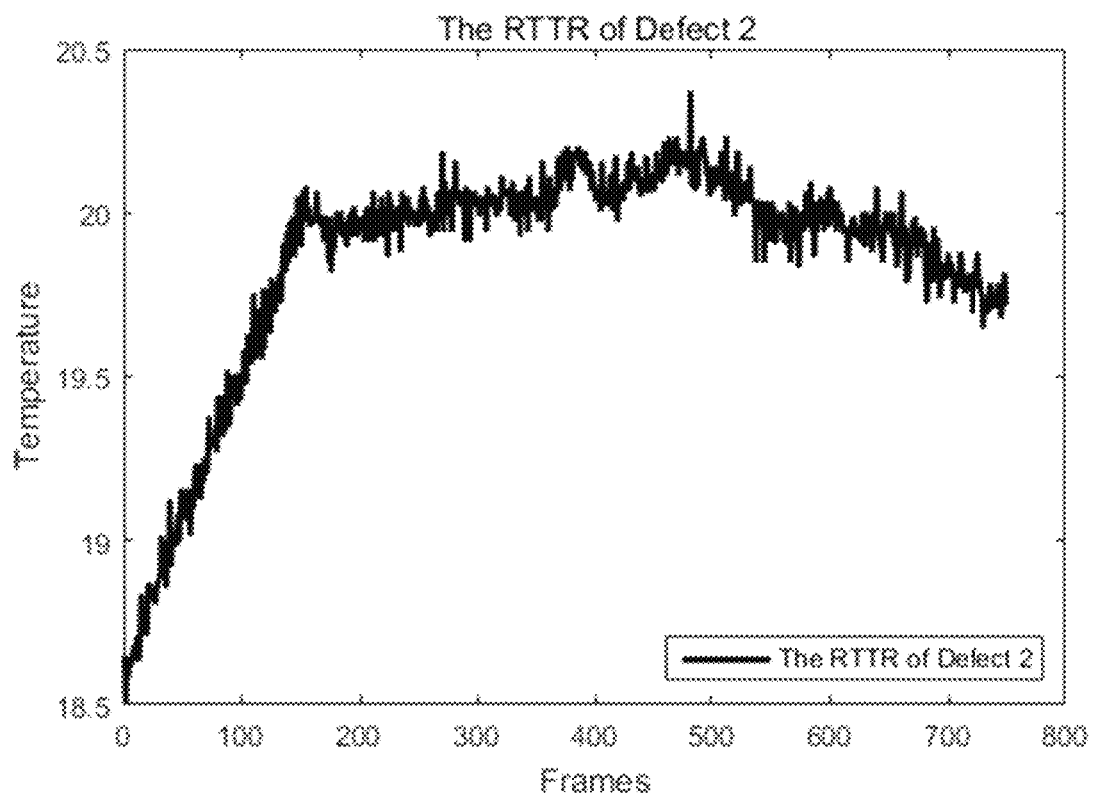

In one embodiment, as shown in FIG. 10, (a) is the RTTR of non-defect cluster, (b) is the RTTR of defect 1 cluster, (c) is the RTTR of defect 2 cluster.

Step S5: putting the RTTRs of L clusters by column to create a matrix Y, where a column is a RTTR, which contains T pixel values of the RTTR, the matrix Y is a matrix with size of T-L;

Step S6: linking the back column to the front column from the first column for each frame of 3D matrix S to obtain T columns of pixels, putting the T columns of pixels by frame order to create a two-dimensional image matrix O with I-j rows and T columns, then performing liner transformation to matrix Y with two-dimensional image matrix O: $R=Y^{-1}*O^T$ to obtain a two-dimensional image matrix R, where $Y^{-1}$ is the pseudo-inverse matrix of matrix Y with size of L-T, $O^T$ is the transpose matrix of two-dimensional image matrix O, two-dimensional image matrix R has L rows and I-j columns;

Step S7: dividing a row of two-dimensional image matrix R into I rows by column size of j, and putting the I rows together by order to obtain a two-dimensional image with size of I-J, where two-dimensional image matrix R has L rows, thus L two-dimensional images are obtained, selecting a two-dimensional image which has maximal difference of pixel value between defect area and non-defect area from the L two-dimensional images;

Step S8: using Fuzzy C-Mean algorithm to cluster the selected two-dimensional image: obtaining each pixel's cluster according to pixel's maximal membership, then setting the pixel value of each cluster center to all pixels of the cluster which the cluster center belongs to, where the selected two-dimensional image is turned into a separated image, and converting the separated image into a binary image, where the binary image is the defect image separated from the thermogram sequence.

Figure 11:
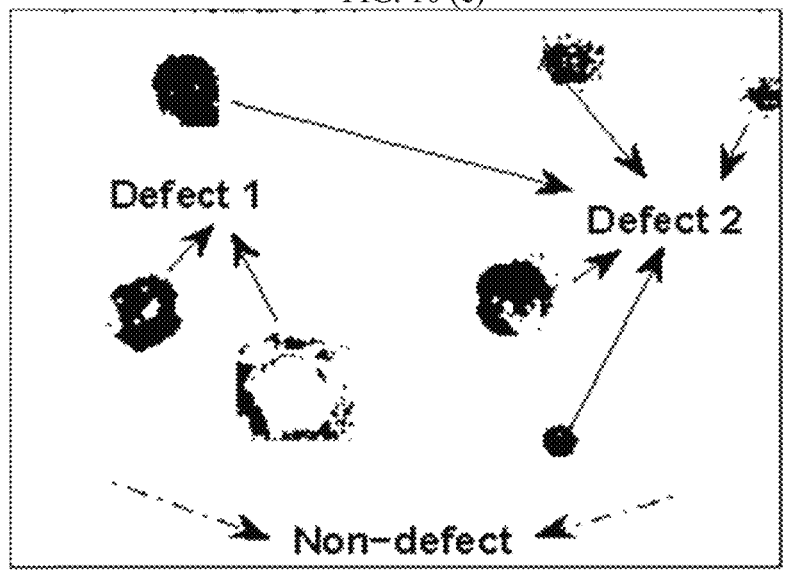
FIG. 11 is a diagram of a defect image separated from a thermogram sequence in accordance with one embodiment of present invention.

In one embodiment, as shown in FIG. 11, a defect image is separated from a thermogram sequence, there has two kind of defect, i.e. defect 1 and defect 2.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for separating out a defect image from a thermogram sequence based on feature extraction and multi-objective optimization, comprising:

taking a thermogram sequence, recorded by an infrared thermal imaging camera, as a three-dimensional (3D) matrix S, where an element S(i,j,t) of the 3D matrix S is a pixel value of row i and column j of the thermogram sequence's frame t, each frame has I rows and J columns;

selecting G transient thermal responses (TTRs) from the 3D matrix S, then extracting each TTR's features: $E^g$, $V_{up}{}^g$, $V_{down}{}^g$, $T_{max}{}^g$, $T_{ave}{}^g$;

where $E^g$ is the TTR's energy, and calculated according to the following equation:

$$E^g = x_{g,1}{}^2 + x_{g,2}{}^2 + \ldots x_{g,T}{}^2$$

g is the serial number of the TTR, g=1, 2, . . . , G, $x_{g,t}$ is the pixel value (temperature value) of TTR g at frame t, t represents 1, 2, . . ., T, T is the number of frames of the thermogram sequence;

where $v_{up}{}^g$ is the TTR's temperature change rate during endothermic process, and calculated according to the following equation:

$$V_{up}^g = \frac{x_{g,t_{mid}} - x_{g,t_0}}{t_{mid} - t_0}$$

$t_{mid}$ is the serial number of the last heating frame, $x_{g,t_{mid}}$ is the pixel value (temperature value) of TTR g at frame $t_{mid}$, $t_0$ is the serial number of the first heating frame, $X_{g,t_0}$ is the pixel value (temperature value) of TTR g at frame $t_0$;

where $v_{down}{}^g$ is the TTR's temperature change rate during endothermic process, and calculated according to the following equation:

$$V_{down}^g = \frac{x_{g,t_{mind}} - x_{g,t_{end}}}{t_{end} - t_{mid}}$$

$t_{end}$ is the serial number of the last heat releasing frame, $x_{g,t_{end}}$ is the pixel value (temperature value) of TTR g at frame $t_{end}$;

where $T_{ave}^g$ is the TTR's average temperature, and calculated according to the following equation:

$$T_{ave}^g = \frac{x_{g,1}x_{g,2} + \ldots + x_{g,T}}{T}$$

where $T_{max}^g$ is the TTR's maximum temperature, and calculated according to the following equation:

$$T_{max}^g = \max(x_{g,1}, x_{g,2}, \ldots, x_{g,T});$$

creating a feature vector $X_g$ for each TTR, where $X_g=(E^g, V_{up}^g, V_{down}^g, T_{ave}^g, T_{max}^g)$, g=1, 2, ..., G, then clustering the TTRs into L clusters based on their feature vectors;

selecting a RTTR (Representative Transient Thermal Response) for each cluster based on multi-objective optimization, where the multi-objective function is:

$$\text{minimize } F(_iX) = (f_1(_iX), \ldots, f_L(_iX))^T$$

$_iX$ is a TTR selected from cluster i', $f_1(i'X)$ is the Euclidean distance between TTR $_iX$ and center of cluster i' and is calculated according to the following equation:

$$f_1(_{i'}X) = \min\sqrt{\sum_{h=1}^{T}(_{i'}x_h - _{i'}Center_h)^2}$$

$_iX$), l=2, 3, ..., L are renumbered Euclidean distances f $^{i'j'}(_iX)$ between TTR $_iX$ and center of cluster j', j≠i', and is calculated according to the following equation:

$$f_{i',j'}(_{i'}X) = \min_{j' \neq i}\left(-\sqrt{\sum_{h=1}^{T}(_{i'}x_h - _{j'}Center_h)^2}\right)$$

$_i$, $x_t$ is the pixel value of TTR $_iX$ at frame t, $_i$, $Center_t$ is the pixel value of the center of cluster i' at frame t, $_jCenter_t$ is the pixel value of the center of cluster j' at frame t;

putting the RTTRs of L clusters by column to create a matrix Y, where a column is a RTTR, which contains T pixel values of the RTTR, the matrix Y is a matrix with size of T×L;

linking the next column to the previous column from the first column for each frame of 3D matrix S to obtain T columns of pixels, putting the T columns of pixels together by frame order to create a two-dimensional image matrix O with I×J rows and T columns, then performing linear transformation to matrix Y with two-dimensional image matrix O: $R=Y^{-1}*O^T$ to obtain a two-dimensional image matrix R, where $Y^{-1}$ is the pseudo-inverse matrix of matrix Y with size of L×T, $O^T$ is the transpose matrix of two-dimensional image matrix O, two-dimensional image matrix R has L rows and I×J columns;

dividing a row of two-dimensional image matrix R into I rows by column size of J, and putting the I rows together by order to obtain a two-dimensional image with size of I×J, where two-dimensional image matrix R has L rows, thus L two-dimensional images are obtained, selecting a two-dimensional image which has maximal difference of pixel value between defect area and non-defect area from the L two-dimensional images;

using Fuzzy C-Mean algorithm to cluster the selected two-dimensional image: obtaining each pixel's cluster according to the pixel's maximal membership, then setting the pixel value of each cluster center to all pixels of the cluster which the cluster center belongs to, where the selected two-dimensional image is turned into a separated image, and converting the separated image into a binary image, where the binary image is the defect image separated from the thermogram sequence.

2. The method for separating out a defect image from a thermogram sequence based on feature extraction and multi-objective optimization of claim 1, wherein the selecting G transient thermal responses (TTRs) from the 3D matrix S comprises:

selecting the maximal pixel value $S(i_{zz}, j_{zz}, t_{zz})$ from the 3D matrix S, where $i_{zz}$, $j_{zz}$ and $t_{zz}$ are respectively the row number, column number and frame number of the pixel which has the maximal pixel value, the frame $T_{zz}$ is taken out from the 3D matrix S, the frame $T_{zz}$ has maximal pixel value at row $i_{zz}$ and column $j_{zz}$;

selecting column $j_{zz}$ of frame $t_{zz}$ from the 3D matrix S, and choosing jumping points according to pixel value's variation of column $j_{zz}$ of frame $t_{zz}$, where a jumping point is located between two adjacent pixels which pixel value's difference is greater than a threshold, and the number of jumping points is P, then dividing the 3D matrix S into P+1 row data blocks by rows which the P jumping points belong to;

selecting the maximal pixel value $S^p(i_{zz}^p, j_{zz}^p, t_{zz}^p)$ from the $p^{th}$ row data block $S^p$, p=1, 2, ..., P+1, where $i_{zz}^p$, $j_{zz}^p$, $t_{zz}^p$, and $t_{zz}^p$ are respectively the row number, column number and frame number of the pixel which has the maximal pixel value, thus the TTR corresponding to the maximal pixel value $S^p(i_{zz}^p, j_{zz}^p, t_{zz}^p)$ is $S^p(i_{zz}^p, j_{zz}^p, t)$, t=1, 2, ..., T;

setting the temperature threshold of $p^{th}$ row data block to $THREE^p$, then calculating the correlation $Re^b$ between TTR $S^p(i_{zz}^p, j_{zz}^p, t)$ and TTR $S^p(i_{zz}^p \pm b, j_{zz}^p, t)$, where pixel interval b is set to 1, 2, ..., in order, meanwhile, judging the correlation $Re^b$: when the correlation $Re^b$ is smaller than $THREE^p$, stopping the calculation of the correlation $Re^b$, where pixel interval b is the step length $CL^p$ of the $p^{th}$ row data block $S^p$;

selecting row $i_{zz}$ of frame $t_{zz}$, from the 3D matrix S, and choosing jumping points according to pixel value's variation of row $i_{zz}$ of frame $t_{zz}$, where a jumping point is located between two adjacent pixels which pixel value's difference is greater than a threshold, and the number of jumping point is Q, then dividing the 3D matrix S into Q+1 column data blocks by columns which the Q jumping points belong to;

selecting the maximal pixel value $S^q(i_{zz}^q, j_{zz}^q, t_{zz}^q)$ from the $q^{th}$ column data block $S^q$, q=1, 2, ..., Q+1, where $i_{zz}^q$, $j_{zz}^q$, and $t_{zz}^q$ are respectively the row number, column number and frame number of the pixel which has the maximal pixel value, thus the TTR corresponding to the maximal pixel value $S^q(i_{zz}^q, j_{zz}^q, t_{zz}^q)$ is $S^q(i_{zz}^q, j_{zz}^q, t)$, t=1, 2, ..., T;

setting the temperature threshold of $q^{th}$ row data block to $THRE^q$, then calculating the correlation $Re^d$ between TTR $S^q(i_{zz}^q, j_{zz}^q, t)$ and TTR $S^q(i_{zz}^q, j_{22}^q \pm d, t)$, where pixel interval d is set to 1, 2, ..., in order, meanwhile, judging the correlation $Re^d$: when the correlation $Re^d$ is smaller than $THRE^q$, stopping the calculation of the correlation $Re^d$, where pixel interval d is the step length $CL^q$ of the $q^{th}$ column data block $S^q$;

dividing the 3D matrix S into $(P+1)\times(Q+1)$ data blocks by the rows which the P jumping points belong to and by columns which the Q jumping points belong to, where the data block at $p^{th}$ by row and $q^{th}$ by column is $S^{p,q}$;

for each data block $S^{p,q}$, setting a threshold DD and initializing set number g=1 and pixel location i=1, j=1, then storing the TTR $S(i_{zz},j_{zz},t)$, t=1, 2, . . . ,T in set X(g), calculating the correlation $Re_{i,j}$ between set X(g) and the TTR $S^{p,q}(i,j,t)$, t=1, 2, . . . , T at $i^{th}$ row, $j^{th}$ column, and judging: if $Re_{i,j}$ <DD, then g=g+1, and storing the TTR $S^{p,q}(i,j,t)$, t=1, 2, . . . , T in set X(g), otherwise $i=i+CL^p$, and continuing to calculate the correlation $Re_{i,j}$ between set X(g) and the TTR $S^{p,q}(i,j,t)$, t=1, 2, . . . ,T at $i^{th}$ row, $j^{th}$ column and judge, where if $i > M^{p,q}$, then $i=i-M^{p,q}$, $j=j+CL^q$, if $j > N^{p,q}$, then terminating the calculation and judgment, each set X(g) is a selected TTR, $M^{p,q}$, $N^{p,q}$ are respectively the number of rows and the number of columns of data block $S^{p,q}$;

putting selected TTRs of all data blocks together to obtain the G transient thermal responses.

3. The method for separating out a defect image from a thermogram sequence based on feature extraction and multi-objective optimization of claim 1, wherein, the clustering the TTRs into L clusters based on their feature vectors comprises:

(1). creating a neural network of Self-Organizing Map (SOM), where the number of neurons of input layer is 5, the number of neurons of mapping layer is L', and clustering the features of G TTRs into L' clusters and taking the centers of the L' clusters as initial weights of neurons of mapping layer, where an initial weight of $l^{th}$ neuron of mapping layer is denoted as $W_l^0=(w_{1,l}^0, w_{2,l}^0, w_{3,l}^0, w_{4,l}^0, w_{5,l}^0)$, l=1, 2, . . . , L', $w_{1,l}^0$, $w_{2,l}^0$, $w_{3,l}^0$, $w_{4,l}^0$, $w_{5,l}^0$ which respectively correspond to the 5 features of an $l^{th}$ center of the L' clusters, comprising TTR's energy, TTR's temperature change rate during endothermic process, TTR's temperature change rate during endothermic process, TTR's average temperature and TTR's maximum temperature, then initializing number of iterations k=0;

(2). in $k^{th}$ iteration, calculating an impact coefficient $B_k^z$ of each feature:

$$B_k^z = \frac{_kH_{fisher}(z)}{\sum_{z'=1}^{5} {_kH_{fisher}(z')}}$$

$$_kH_{fisher}(z) = \frac{\sum_{l_1=1}^{L}\sum_{l_2=1}^{L}({_k\mu_{l_1}^z} - {_k\mu_{l_2}^z})^2}{\sum_{l_1=1}^{L}\sum_{l_2=1}^{L}({_k\sigma_{l_1}^{z2}} - {_k\sigma_{l_2}^{z2}})}$$

$$_kH_{fisher}(z') = \frac{\sum_{l_1=1}^{L}\sum_{l_2=1}^{L}({_k\mu_{l_1}^{z'}} - {_k\mu_{l_2}^{z'}})^2}{\sum_{l_1=1}^{L}\sum_{l_2=1}^{L}({_k\sigma_{l_1}^{z'2}} - {_k\sigma_{l_2}^{z'2}})}$$

where $B_k^z$ is an impact coefficient of $z^{th}$ feature in $k^{th}$ iteration, $_k\mu_{l_1}^z$, and $_k\sigma_{l_1}^{z2}$ are a mean and a variance of $z^{th}$ feature in $l_1^{th}$ cluster in $k^{th}$ iteration, $_k\mu_{l_2}^z$ and $_k\sigma_{l_2}^{z2}$ are a mean and a variance of $z^{th}$ feature in $l_2^{th}$ cluster in $k^{th}$ iteration, $_k\mu_{l_1}^{z'}$ and $_k\sigma_{l_1}^{z'2}$ are a mean and a variance of $z'^{th}$ feature in $l_1^{th}$ cluster in $k^{th}$ iteration, $_k\mu_{l_2}^{z'}$ and $_k\sigma_{l_2}^{z'2}$ are a mean and a variance of $z'^{th}$ feature in $l_2^{th}$ cluster in $k^{th}$ iteration;

updating the weights of neurons of mapping layer: choosing a feature vector of a TTR, where the feature vector is denoted by $X_g^k = (E^{g,k}, V_{up}^{g,k}, V_{down}^{g,k}, T_{ave}^{g,k}, T_{max}^{g,k})$, and calculating the Euclidean distance $D_{g,l}^k$ between vector $X_g^k$ and neuron weight $w_l^k$ of $l^{th}$ neuron of mapping layer:

$$D_{g,l}^k = \sqrt{\begin{array}{l}B_k^1(E^{g,k} - w_{1,l}^k) + B_k^2(V_{up}^{g,k} - w_{2,l}^k) + \\ B_k^3(V_{down}^{g,k} - w_{3,l}^k) + B_k^4(T_{ave}^{g,k} - w_{4,l}^k) + B_k^5(T_{max}^{g,k} - w_{5,l}^k)\end{array}}$$

where $W_l^k = (w_{1,l}^k, w_{2,l}^k, w_{3,l}^k, w_{4,l}^k, w_{5,l}^k)$, l=1, 2, . . . , L';

taking the neuron of mapping layer nearest to $X_g^k$ as a winning neuron $l^*$, that is:

$l^* = \arg\min(D_{g,l}^k)$;

updating the weight of winning neuron and weights of its neighbors according to the weight $w_{l^*}^k$ of winning neuron $l^*$:

$W_{\hat{l}}^{k+1} = W_{\hat{l}}^k + \eta(k)h_{\hat{l}l^*}(k)(X_g^k - W_{\hat{l}}^k)$ where $\hat{i}$ is one neuron of the neuron set composed of a winning neuron and the winning neuron's neighbors, $\eta(k)$ is a learning factor and is calculated according to the following equation:

$$\eta(k) = \begin{cases} 1 & k = 0 \\ \dfrac{D_{g,l}^k}{\max(D_{g,l}^k, D_{g,l}^{k-1})} & k \geq 1 \end{cases}$$

$$D_{g,l}^{k-1} = \sqrt{\begin{array}{l}B_{k-1}^1(E^{g,k} - w_{1,l}^{k-1}) + B_k^2(V_{up}^{g,k} - w_{2,l}^{k-1}) + \\ B_k^3(V_{down}^{g,k} - w_{3,l}^{k-1}) + B_k^4(T_{ave}^{g,k} - w_{4,l}^{k-1}) + B_k^5(T_{max}^{g,k} - w_{5,l}^{k-1})\end{array}}$$

where $h_{\hat{i}l^*}(k)$ is:

$$h_{\hat{i}l^*}(k) = \exp\left(-\frac{\|r_i - r_{l^*}\|^2}{(\delta \cdot \eta(k))^2}\right)$$

$\|r_l - r_{l^*}\|^2$ is a distance of winning neuron $l^*$ from neuron $\hat{i}$, $\delta$ is a constant;

choosing each feature vector of the G TTRs to update the weights of neurons of mapping layer;

choosing each feature vector of G TTRs, where the feature vector is denoted by $X_g^{k+1}$, $E^{g,k+1}$, $V_{up}^{g,k+1}$, $V_{down}^{g,k+1}$, $T_{ave}^{g,k+1}$, $T_{max}^{g,k+1}$), then inputting vector $X_g^{k+1}$ into the neural network of Self-Organizing Map: calculating the Euclidean distances of vector $X_g^{k+1}$ from neuron weights $w_1^{k+1}, W_2^{k+1}, W_L^{k+1}$ of mapping layer, and reclassifying vector $X_g^{k+1}$ into the cluster the nearest neuron weight belongs to;

(3). when $k > k_{max}$ or $|W_l^{k+1} - W_l^k| < \epsilon$, terminating iteration, otherwise, k=k+1 and returning step (2);

(4). clustering the L' clusters into L clusters by merging the clusters which Euclidean distances of cluster centers between each other are all smaller than a thresholds, where the merged cluster the feature vector of a TTR belongs to is the cluster of the TTR, whereby the G TTRs are clustered into L clusters.

* * * * *